April 21, 1964 L. THEVENAZ 3,129,945

AUTOMATIC DEVICE FOR THE PLACING IN PLAYING POSITION OF RECORDS OF A RECORD CHANGER

Filed May 1, 1961 2 Sheets-Sheet 1

INVENTOR

LOUIS THEVENAZ

By Irvin S. Thompson

ATTY.

INVENTOR
LOUIS THEVENAZ
By Irwin S. Thompson
ATTY.

United States Patent Office 3,129,945

Patented Apr. 21, 1964

3,129,945

AUTOMATIC DEVICE FOR THE PLACING IN PLAYING POSITION OF RECORDS OF A RECORD CHANGER

Louis Thevenaz, Les Rasses, Switzerland, assignor to Thorens S.A., Sainte-Croix, Switzerland, a corporation of Switzerland Filed May 1, 1961, Ser. No. 106,737
Claims priority, application Switzerland May 5, 1960
12 Claims. (Cl. 274—10)

In the automatic record changers of new design, for example of the type described in the Swiss Patent No. 362,241, the pile of storage records rests only on the bearing surfaces of a record bearing rod passing through their centre, in the absence of any exterior equilibrating device of said pile. This disposition ensures at the same time a simpler and cheaper construction of the apparatus and an easier handling for the user. The record changers of this type work generally in a satisfactory way only when well balanced records are used.

In fact, for construction reasons, the maximum diameter at which the bearing surfaces are located away from the rod does not exceed 14 to 15 mm. in the known apparatus. When there are only three bearing surfaces, as is generally the case, the effective distance between the axis of the rod and one of the sides of the bearing triangle is less than 5 mm. But records having a centre of mass which is situated at a distance of this order from the geometrical centre are frequent on the market. Such records, when placed on the rods of this type, tend to tilt and introduce from this fact important perturbations in the delivering of the records, as well as in certain automatic selecting devices which select the records according to their diameter. The introducing of six bearing surfaces on the same rods gives only a slight improvement in this situation, but renders the construction much more complicated.

An increase of the bearing diameter of the records could not be realized until now, since the bearing surfaces have to be able to retire into the inside of the rod, in order to enable, on the one hand, the lower record of the storage pile to descend on the plate of the turn-table and, on the other hand, the pile of played records to be taken upward again along said rod at the end of listening. The bearing surfaces have to be constituted by elastic blades or wires, and experience has shown that, when they are located on too great a diameter, they undergo great bending. When an unbalanced record rests on such bearing surfaces, these latter are bent unequally and thus cannot maintain the record in horizontal position. On the other hand, the bending of the bearing surfaces, under the weight of the record storage pile, disturbs the working of the retaining device of said pile which depends upon a very precise level of said bearing surfaces.

The replacement of the supple bearing surfaces by rigid surfaces articulated at one point on the rod does not enable the use of a large bearing diameter either, since a very large space is then required to make such surfaces disappear in the inside of the rod.

The present invention has for its object an automatic device for the placing of the record in playing position for record changers, comprising a record bearing rod passing through the center holes of the stored records, having a bearing surface intended to receive at least one storage record during at least a part of the cycle of the record changer, characterized by the fact that said bearing surface is constituted by at least two bearing points provided on bearing members each comprising at least two branches displaceable the one with respect to the other in a radial plane of the record bearing rod, and by the fact that each bearing member is in contact by means of three different points with the record bearing rod and the record, at least one of said contact points being constituted by one of said bearing points, the whole disposed so that each of these bearing members is able to withdraw into the inside of said record bearing rod to permit the passage of the records along said record bearing rod, in either direction.

The annexed drawing illustrates schematically and by way of example two embodiments of the bearing members according to the invention.

Figures 1, 2, 3, 4:
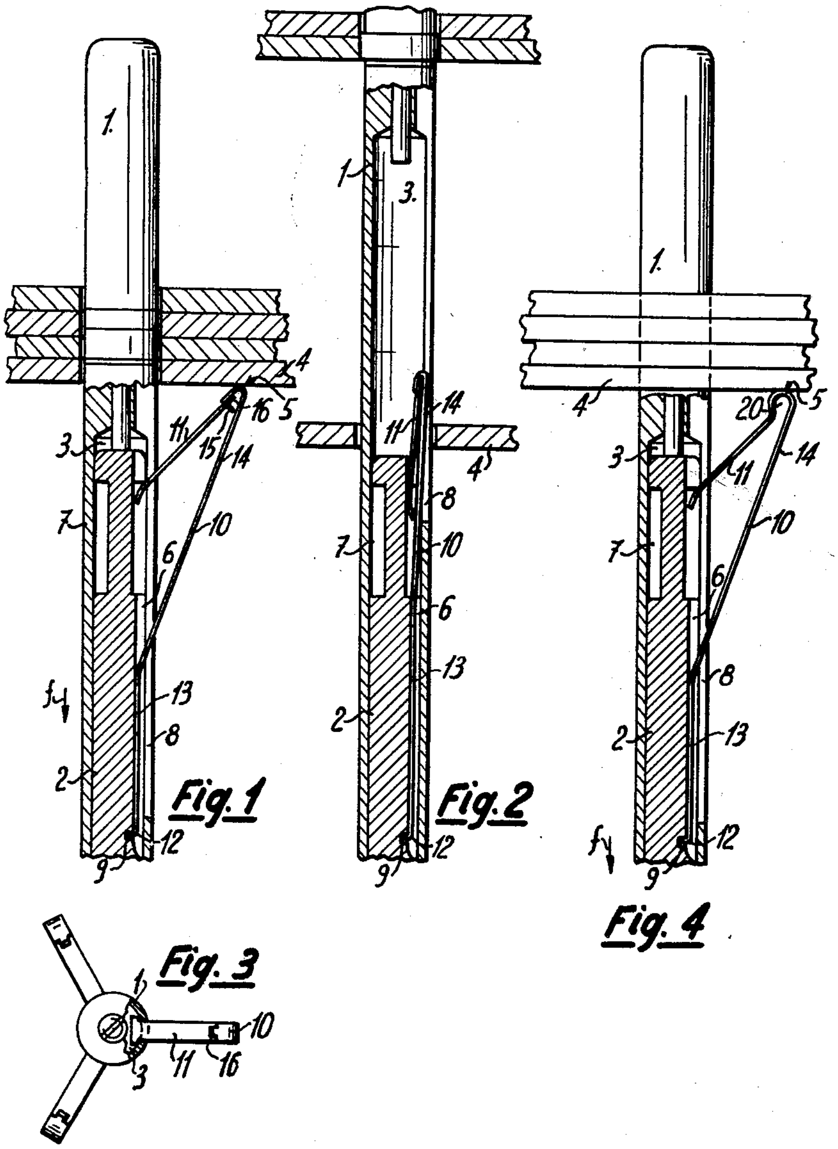
FIG. 1 is a cross-section of a record bearing rod provided with bearing members according to the first embodiment of the invention, these bearing members being in working position.
FIG. 2 is a view corresponding to FIG. 1, the bearing members being in their retired position.
FIG. 3 is a plan view of FIG. 1.
FIG. 4 is a section of a record bearing rod provided with bearing members according to the second embodiment of the invention, these bearing members being in working position.

The annexed drawing illustrates a record bearing rod 1 provided with a record delivering device that may be, for example, of the type described in the Swiss Patent No. 362,241. This record delivering device comprises a control rod 2, a member retaining the record in rest position, and bearing members which are precisely the object of the present invention. The record bearing rod 1 is fixed in the centre of a plate of a record changer (not illustrated). The control rod 2 of the record delivering device slides freely in the inside of record bearing rod 1 in a housing 3 under the action of the cycle control mechanism of the changer (not shown). This control rod 2 comprises longitudinal slots 6 uniformly disposed along its periphery. The upper part of each of these slots ends in an annular lodging 7 equally provided in said control rod 2. In front of these slots 6, apertures 8 are made in the record bearing rod. A circular groove 9, provided in the control rod 2, ends in the lower part of each of the slots 6.

The bearing surface, on which a record 4 rests during a major portion of its travel from its storage position to its playing position, is constituted by bearing points 5. Each of said bearing points 5 is formed by the upper part or parts of a bearing member.

In the first embodiment illustrated in FIGS. 1 to 3, each of said bearing members is constituted by two branches 10 and 11, formed by spring blades, articulated the one with respect to the other at one of their extremities and resting on the control rod 2 upon their other extremity.

The branch 10 presents at its lower extremity a stop 12 engaged inside the groove 9 and which mechanically connects branch 10 to the control rod 2. Said branch 10 includes two approximately rectilinear portions forming an angle between them. The lower part 13 is lodged inside one of the slots 6 and is applied against the control rod, whereas the upper part 14 extends, in the working position, out of the record bearing rod 1 through one of the apertures 8. The upper extremity of said part 14 is bent and is provided with a tongue 15 disposed approximately at a right angle to the bent extremity.

The branch 11 contains a hole 16 at one of its extremities, in which the tongue 15 is engaged. In this way, the branches 10 and 11 are hinged the one to the other by means of their upper extremities. The lower extremity of said branch 11 is engaged through an aperture 8 and is located inside the annular lodging 7, provided in the control rod 2. This lower extremity takes the general shape of a T, the wings of which rest on the internal wall of the record bearing rod 1.

When axially displacing the control rod 2 in the direction *f* from the position illustrated in FIG. 1 to reach the one illustrated in FIG. 2, the upper part 14 of the branch 10 enters in contact with the wall of the record bearing rod 1 at the lower extremity of the aperture 8, which tends to unbend this branch 10 and thus to make the bearing member 10, 11 retire or disappear inside said record bearing rod. The branch 11 pivots around the blade spring 10 at its upper extremity, whereas its lower end displaces inside the annular lodging 7.

In working position, the stiffness of the bearing member is ensured by the branch 11 constituting a tie-rod which prevents the branch 10 from bending under the weight of the pile of records that have to be successively placed in the playing position.

Thanks to the bracing of the bearing members produced by their branches 11 it is possible to place the bearing points 5 on a relatively large circumference (20 to 30 mm.) corresponding approximately to twice the diameter realized in the actually existing devices, while still avoiding any bending of the bearing members. It is thus possible to maintain even unbalanced records (the centers of mass of which are not geometrically centered) in a horizontal position and thus to ensure correct functioning of a record delivering device.

In the second embodiment of the bearing members illustrated at FIG. 4 each of the bearing members is equally constituted by two branches 10 and 11, the lower ends of which co-operate with the control rod 2 in the way described with reference to the first embodiment. The difference of this embodiment with respect to the first one resides in the articulation of these two branches 10 and 11 the one with respect to the other. In the second embodiment illustrated in FIG. 4, the two branches 10 and 11 are articulated one on the other by means of an elastic connection having the general shape of a ring 20. The relative displacements of one of said branches with respect to the other, necessary for the working of said bearing members, are effected by elastic deformation of said ring 20.

The operation of said embodiment is similar to that of the first embodiment. The bearing members pass from their working position (FIG. 4) to their retired or retracted positon in the record bearing rod 1 by axial displacement of the control rod 2 in the direction of the arrow *f*.

In said second embodiment also, the branch 11 acts as a tie-rod, subjected to tensile strengths, and hinders any bending of the branch 10 under the weight of the records.

In the two embodiments described in reference to the FIGS. 1 to 4, each bearing member rests on the control rod 2 at two different points, located at different levels, and each of said members is in contact at one point with the lower face of the lower record of the storage pile. Seen from the side, these bearing members present the general shape of a triangle, two sides of which are constituted by the branches 10 and 11, whereas the third side is formed by the control rod. With this disposition an effect of triangulation is obtained, which results in great stiffness of the bearing members, even when the bearing points 5, on which the record pile rests, are located on a circle of large diameter.

Figure 5:
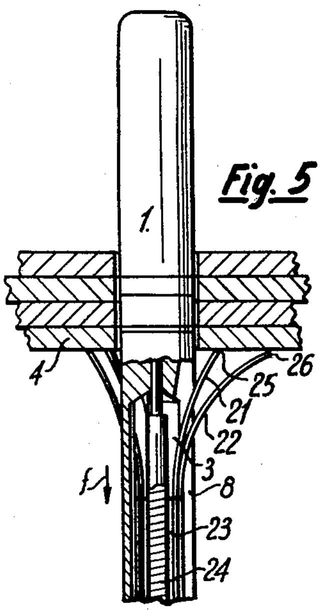
FIGS. 5 to 7 are corresponding views to the FIGS. 1 to 3 of the third embodiment of the bearing members.
Figure 6:
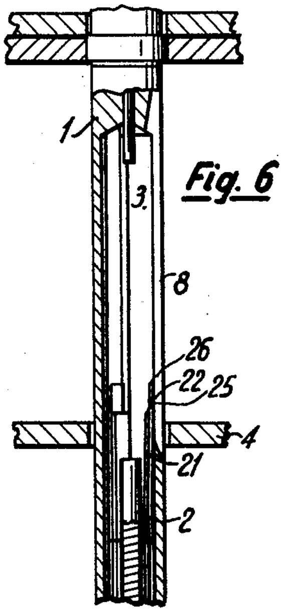
Figure 7:
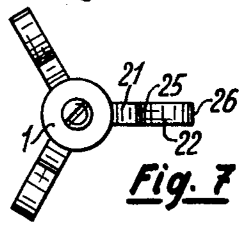

In the third embodiment shown in FIGS. 5 to 7, each bearing member is constituted by two branches 21, 22 formed by blade springs. The lower extremities of said branches 21, 22 are connected together and are disposed in slots 23 provided in the control rod 24 of a record delivering device. These two branches are normally outwardly arcuated and extend radially out of the record bearing rod 1 through apertures 8 located in front of the slots 23, when the bearing members are in the working position.

The branch 21 is somewhat shorter than the branch 22, so that when the bearing member is in its working position, the upper extremities 25, 26 of each of said branches 21, 22 enter in contact with the lower record of the storage pile at points located at different distances of the axis from the record bearing rod.

The working of said embodiment is the same as with the preceding embodiments. When the control rod 24 is lowered, the branch 22 comes in contact with the lower end of the aperture 8, which unbends the branches 21, 22 until they reach a disappeared position inside the record bearing rod (FIG. 6).

In said embodiment, each bearing member rests at a single point on the control rod 24 and comes in contact at two different points with the lower face of the record storage pile. These two contact points are located on different radii. There also, the bearing members show, in side view, the general shape of a triangle, two sides of which are constituted by the branches 21, 22, whereas the third side is formed by a part of a radius of the lower face of the record storage pile.

The greatest part of the weight of the record storage pile is absorbed by the branches 21 resting on said storage pile at points located on a circumference of a diameter approximately equal to the diameter of the bearing surfaces of the actually existing apparatus (10 to 15 mm.). The branches 22, the extremities of which are located on a considerably larger diameter (20 to 30 mm.), serve to equilibrate the storage pile or the record having to pass in playing position. These branches 22 serve to maintain unbalanced records in a horizontal position during their travel from the storage position to the playing position, thus avoiding any malfunctioning of the record delivering device. In fact, these branches 22 support only a small part of the weight resting on the bearing members, so that, even though their extremities are situated on a large diameter and their length is great, their bending is practically negligible.

Three embodiments have been described and illustrated by way of example, but it is evident that many variants could be foreseen without departing from the scope of the present invention. Particularly, the realization of the hinge connecting the two branches of a bearing member could be different, the main requirement being that the branches of each same bearing member may displace themselves with respect to each other, so as to enable the passage of the bearing members from their working position to their disappeared position. On the other hand, the mechanical connection between the branches of the bearing members and the control rod could be also differently realized as long as the working of the device is insured.

I claim:

1. In an automatic record changer comprising a turntable, a spindle centrally mounted with respect to said turntable, record supporting means provided on said spindle to hold a stack of records on said spindle above said turntable, lowering means associated with said supporting means to lower said records individually onto said turntable, said record supporting means comprising a plurality of supporting members angularly disposed around and articulated on said spindle for free movement between an active open position in which their upper extremities are situated at a distance from the axis of said spindle substantially larger than the diameter of said spindle and in a vertical plane with respect to said axis, and an inactive closed position in which said supporting members are retired inside of said spindle to allow a record to freely fall along said spindle onto said turntable, each of said supporting members comprising at least two distinct members displaceable the one with respect to the other approximately situated in the same axial plane of said spindle and each adapted to support a part of the weight of the records resting on said supporting means.

2. In an automatic record changer comprising a turntable, a spindle centrally mounted with respect to said turntable, record supporting means provided on said spindle to hold a stack of records on said spindle above said turntable, lowering means associated with said supporting means to lower said records individually onto said turntable, said record supporting means comprising a plurality of supporting members angularly disposed around and articulated on said spindle for free movement between an active open position in which their upper extremities are situated at a distance from the axis of said spindle substantially larger than the diameter of said spindle and in a vertical plane with respect to said axis, and an inactive closed position in which said supporting members are retired inside of said spindle to allow a record to freely fall along said spindle onto said turntable, each of said supporting members comprising at least two distinct members approximately situated in the same axial plane of said spindle and each of them being adapted to support a part of the weight of the records resting on said supporting means, said two distinct members of said supporting members comprising a first arm articulated on the spindle by its lower extremity, a second arm articulated on the spindle by one of its extremities at a level substantially higher on said spindle than said first arm, said two arms being articulated on each other to constitute, in the active open position of said supporting members, a triangulated system of greater rigidity than the rigidity of each of said individual arms.

3. A device as claimed in claim 1 in which the two distinct members of each supporting member are coupled the one to the other at their free end to provide for only one bearing point with the pile of storage records.

4. A device as claimed in claim 3 which comprises further a control rod located inside said spindle, longitudinal slots provided in said control rod, the lower ends of one of the two distinct members of each supporting member being engaged in said slots.

5. A device as claimed in claim 3 which comprises further a control rod located inside said spindle, longitudinal slots provided in said control rod, the lower end of one distinct member of each supporting member being coupled to the said control rod.

6. A device as claimed in claim 5, in which the lower end of the other distinct member presents the shape of a T which is situated inside an annular lodging provided in the control rod.

7. A device as claimed in claim 3 in which the upper extremity of one distinct member of each supporting member comprises an opening in which a tongue provided on the upper end of the other distinct member is engaged.

8. A device as claimed in claim 3 in which an elastic connection hinges the two distinct members of the supporting member one to the other, these two members and said connection being made out of one piece of fabrication.

9. A device as claimed in claim 8 in which the elastic connection has the general shape of a ring.

10. A device as claimed in claim 1 which comprises further a control rod located inside said spindle, and in which both distinct members of each supporting member are elastic and connected the one to the other by their lower ends, these lower ends being connected to the control rod.

11. A device as claimed in claim 10 in which the distinct members have different lengths.

12. A device as claimed in claim 10 in which at least one of the distinct members of each supporting member tends to be placed in a position spaced apart from the spindle by its own elasticity.

References Cited in the file of this patent

UNITED STATES PATENTS

| | | |
|---|---|---|
| 2,626,157 | Jablonski | Jan. 20, 1953 |
| 2,949,307 | Mueller | Aug. 16, 1960 |

FOREIGN PATENTS

| | | |
|---|---|---|
| F15327 | Germany | Oct. 20, 1955 |
| 1,038,785 | Germany | Sept. 11, 1958 |
| 1,072,399 | Germany | Dec. 31, 1959 |
| 1,093,106 | Germany | Nov. 17, 1960 |
| 1,130,354 | France | Sept. 24, 1956 |